(12) United States Patent
Bellanger

(10) Patent No.: US 6,384,327 B1
(45) Date of Patent: May 7, 2002

(54) INSULATING HOUSING FOR EQUIPMENT TO BE ATTACHED TO THE BASE SECTION OF TRUNKING BY MEANS OF A SUPPORT

(75) Inventor: Jerome Bellanger, Le Mans (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/620,376

(22) Filed: Jul. 20, 2000

(30) Foreign Application Priority Data

Jul. 20, 1999 (FR) .......................................... 99 09400

(51) Int. Cl.⁷ ................................................ H02G 3/04
(52) U.S. Cl. ....................... 174/48; 174/68.1; 52/220.7; 439/207
(58) Field of Search .......................... 174/48, 64, 65 R, 174/70 C, 72 C, 68.1, 68.3, 97, 101, 96, 98, 99 R; 52/220.7, 239; 439/120, 207, 209, 211, 113; 248/27.1, 558, 544; 220/4.02

(56) References Cited

U.S. PATENT DOCUMENTS

| 2,384,487 A | * | 9/1945 | O'Brien | 439/113 |
| 3,161,974 A | * | 12/1964 | Blockson | 439/120 X |
| 3,634,809 A | * | 1/1972 | Joly | 439/214 |
| 4,017,137 A | * | 4/1977 | Parks | 174/48 X |

FOREIGN PATENT DOCUMENTS

| EP | 0 222 116 | 5/1987 | | |
| EP | 0 289 410 | 11/1988 | | |
| EP | 0 391 713 | 10/1990 | | |
| EP | 000535527 | * | 4/1993 | 174/48 |
| GB | 2254966 | * | 10/1992 | 174/48 |
| WO | WO 96/11518 | 4/1996 | | |

* cited by examiner

Primary Examiner—Dean A. Reichard
Assistant Examiner—Dhiru R Patel
(74) Attorney, Agent, or Firm—Young & Thompson

(57) ABSTRACT

An insulative housing including suspension members for attaching it to a support by means of which equipment can be attached to the base section of trunking and a shroud which surrounds the equipment attached to the support, at a distance therefrom. The shroud has a side wall. The suspension members have attachment members at two or more different levels and, over at least a part of the perimeter of the shroud, at least the top portion of the side wall of the shroud is removable. Applications include electrical equipment housings.

16 Claims, 6 Drawing Sheets

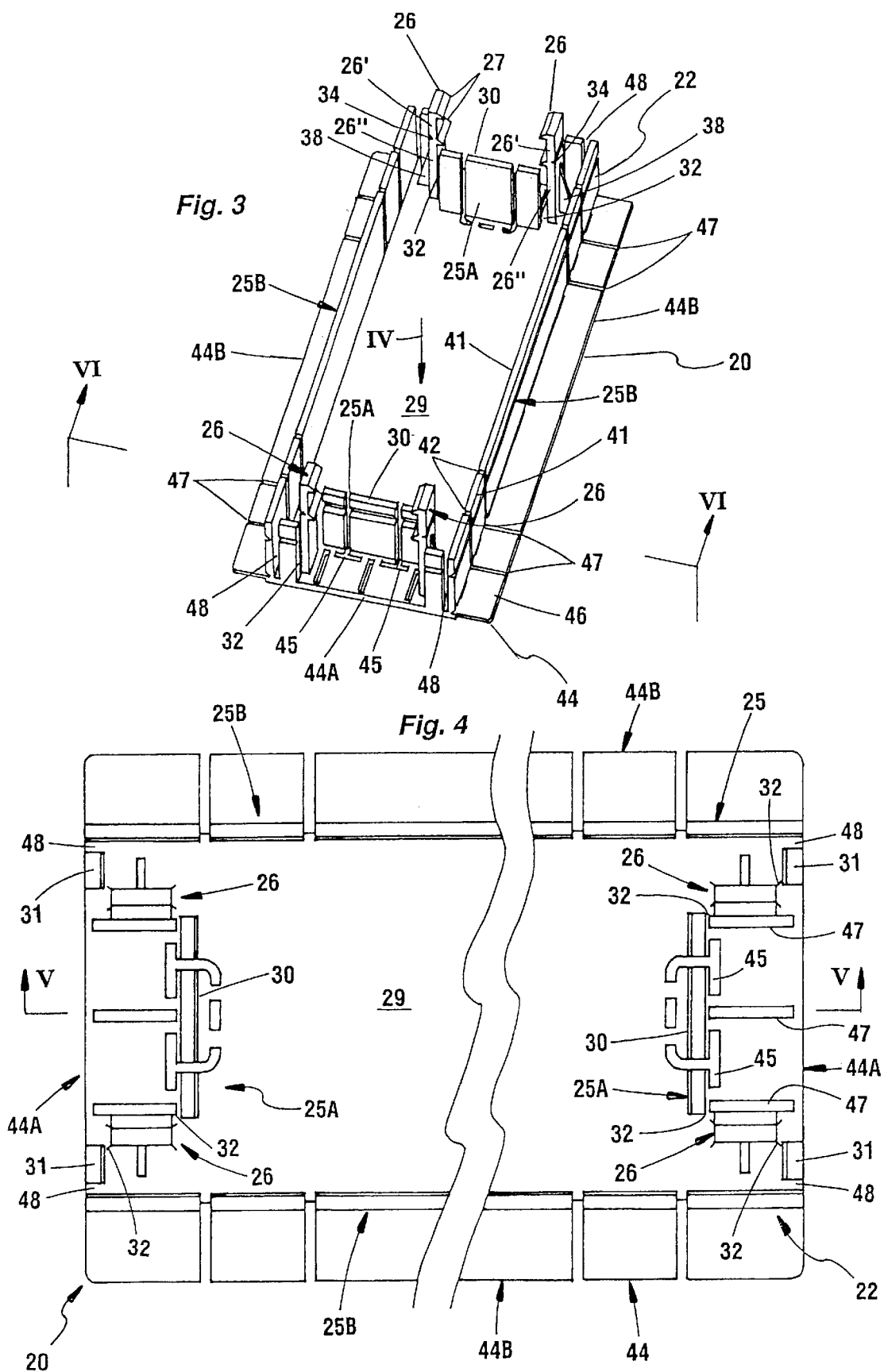

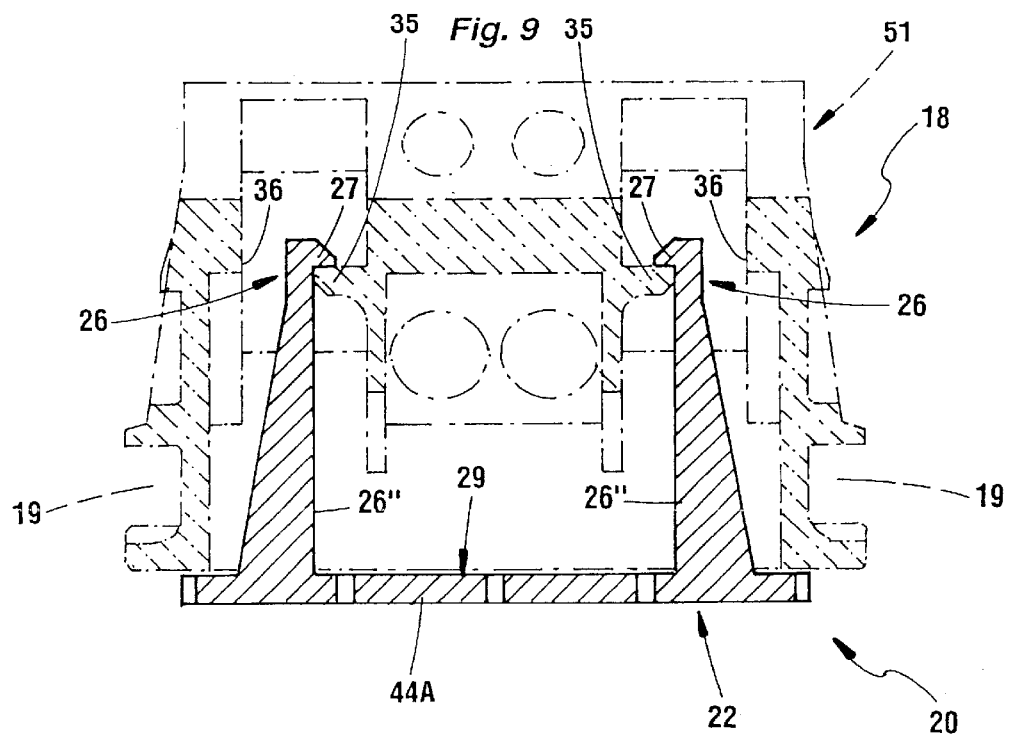
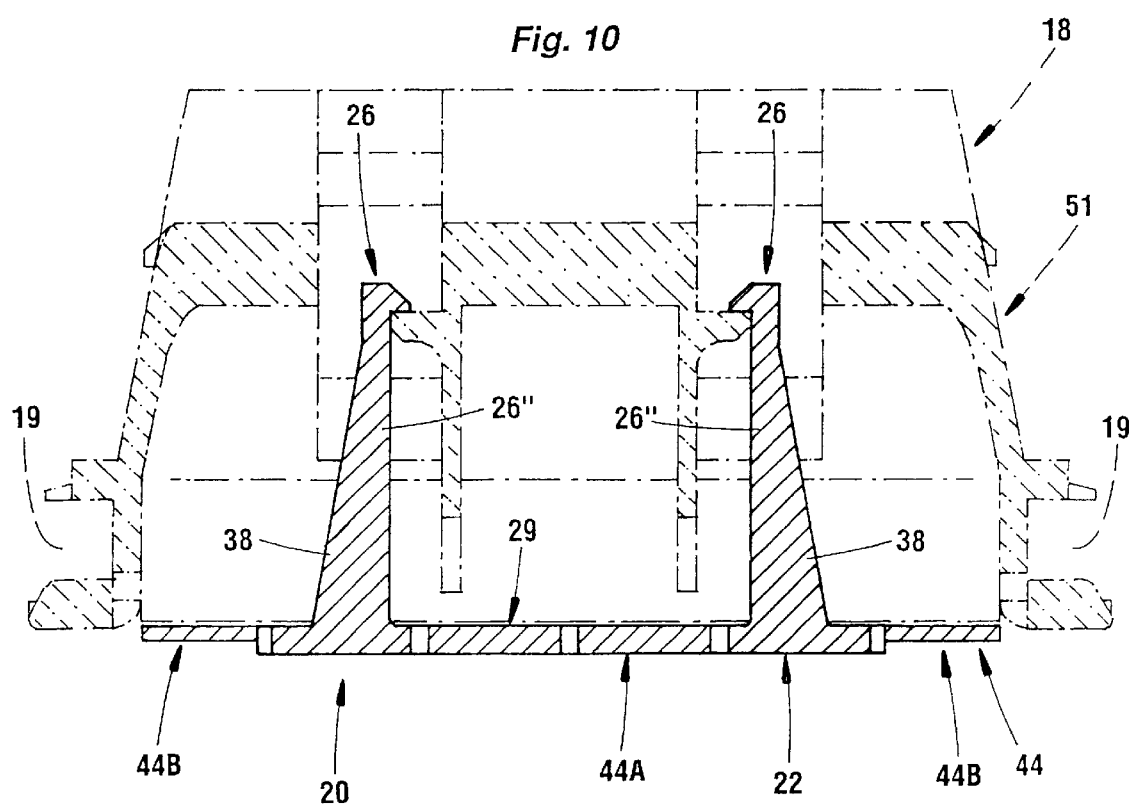

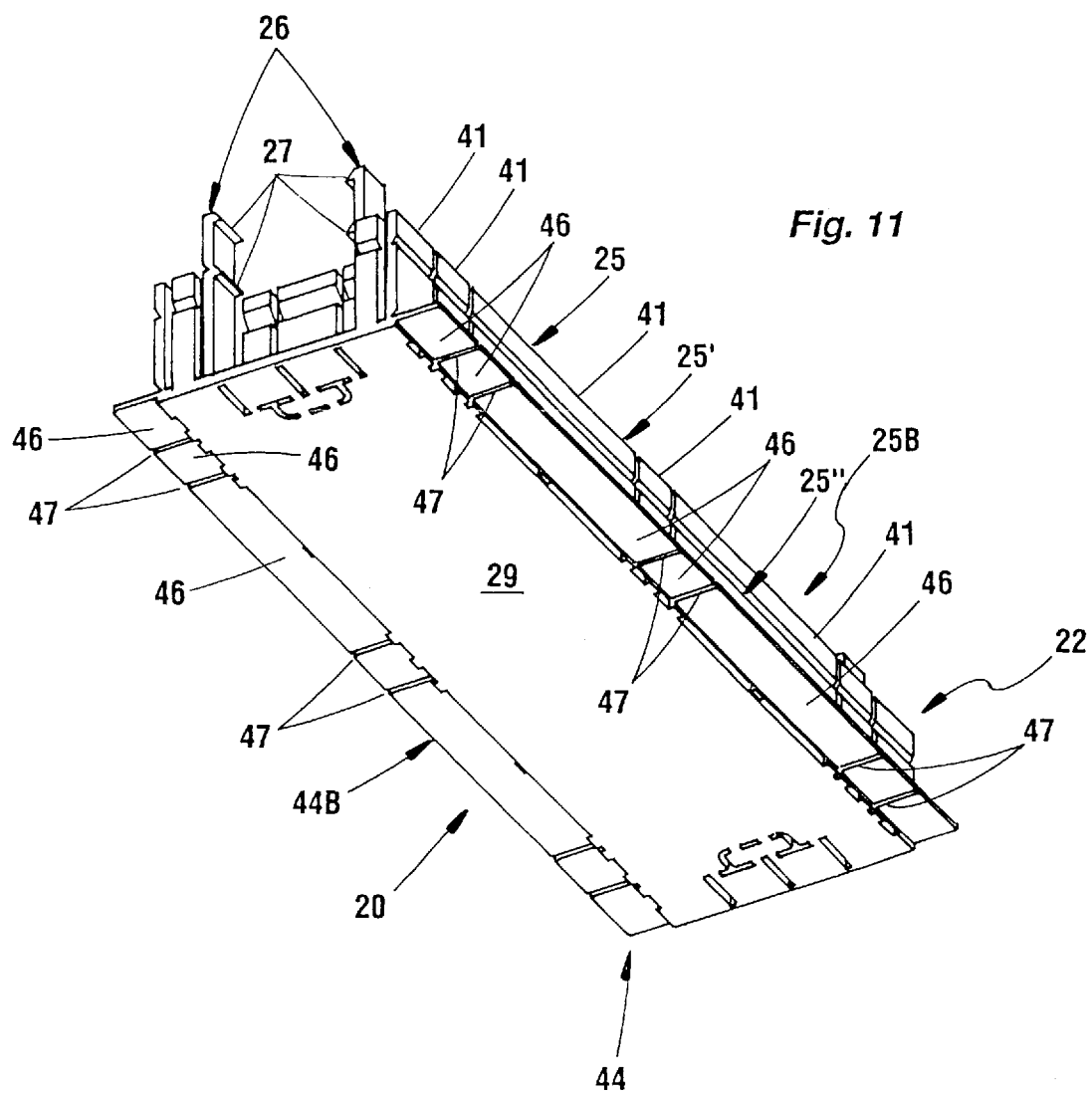

INSULATING HOUSING FOR EQUIPMENT TO BE ATTACHED TO THE BASE SECTION OF TRUNKING BY MEANS OF A SUPPORT

BACKGROUND OF THE INVENTION

1. Field of the invention

The present invention relates generally to the equipment of trunking used to support, house and protect various equipment, for example, and in particular electrical equipment, and to house and to protect cables, conductors and other connections serving such equipment.

In the usual way, in the present context the term "trunking" refers to a molding comprising a base section, which has an open cross section, and a cover section which is attached to the base station to close it. In practice the cover section is clipped to the base section.

The present invention addresses in particular the situation in which, to attach it to the trunking, equipment is attached to a support which is itself attached to the base section of the trunking.

It is even more particularly directed to the situation in which the support used for this purpose, i.e. to attach equipment to the base section of the trunking, is operative at the outlet of the base section, for example extending between two rims that the trunking has along the free edge of its side flanges.

The present invention relates yet more particularly to the insulating housing which is usually placed around the equipment, at a distance from it, to provide all of the necessary protection against direct access to the active parts of such equipment when the cover section of the trunking is removed, for example if one or more additional cables or conductors have to be installed.

2. Description of the prior art

At present the insulative housing is usually fixed to the back of the base section of the trunking, as is the case with European patent application No. 0 222 116, for example.

However, two problems then arise.

The first is that when the insulative housing extends outward from the back of the base section, the only remaining free space within the base section for the necessary cables or conductors to pass through is reduced to any remaining space laterally of the insulative housing, which can cause difficulties if the insulative housing is relatively wide and/or the trunking is relatively narrow.

The second problem is that the height of the insulative housing must be suited to the height of the trunking.

To this end, European patent application No. 0 222 116 proposes that the insulative housing be made in two parts which are mobile relative to each other in the direction of their height. This makes manufacture singularly more complicated and therefore more costly.

Otherwise, as many insulative housings of different height must be available as there are different heights of trunking to which they are to be fitted.

To overcome at least some of these problems it has been proposed to suspend the insulative housing from the support carrying the equipment concerned, as is the case with international patent application No. 96/11518, for example.

To be more precise, international patent application No. 96/11518 proposes an insulative housing including suspension means enabling it to be attached to an equipment support and a shroud adapted to surround the equipment mounted on the support, at a distance therefrom, the shroud in practice comprising a back and a side wall and therefore being generally cup-shaped.

Unlike an insulative housing fixed to the back of the base section of the trunking, an insulative housing of this kind has the advantage of enabling cables or conductors to pass between it and the back of the base section.

However, the suspension means with which the insulative housing is provided in international patent application No. 96/11518 are reduced to detents which project directly from the side wall of the shroud, at the same level, and cooperate with complementary detents provided for this purpose on the equipment support.

As a result the height at which the insulative housing is suspended in the trunking is fixed, as is the height of the side wall of its shroud.

Thus although an insulative housing of the above kind is suitable for trunking of a given height and/or for a support of a particular kind, it is not necessarily so for trunking of different heights and/or for supports of different kinds.

In particular, for thin trunking, for which a raised support projecting at least partly from the trunking is usually employed, the insulative housing suspended from the support can, as previously, have the very unfavorable effect of reducing the internal volume that remains available for cables or conductors to pass between it and the back of the base section.

A general object of the present invention is to minimize or even eliminate this drawback.

SUMMARY OF THE INVENTION

To be more precise, the present invention provides an insulative housing for equipment to be attached to the base section of trunking by means of a support, the housing including suspension means for attaching it to the support and a shroud adapted to surround the equipment attached to the support, at a distance therefrom, the shroud having over at least part of its perimeter a side wall, wherein the suspension means are suspension members which have attachment means at two or more different levels and, over at least a part of its perimeter, at least the top portion of the side wall of its shroud is removable.

The height at which the insulative housing according to the invention is suspended in the trunking can therefore be adjusted optimally according to the height of the trunking and/or the type of support attached to the base section of the trunking.

In other words, the arrangement in accordance with the invention has the advantage that the volume of the insulative housing can be matched optimally to the general configuration of the system to minimize its impact on the usable internal volume of the trunking, leaving in the trunking all the necessary space for the required cables or conductors to pass through.

The features and advantages of the invention will emerge from the following description, which is given by way of example only and with reference to the accompanying diagrammatic drawings.

BRIEF DESCRIPTION OF THE DRAWINGS

FIG. 3 is a perspective view of the insulative housing according to the invention seen in isolation and from above, before cutting it.

FIG. 4 is a partial plan view of the insulative housing to a larger scale and as seen from above, in the direction of the arrow IV in FIG. 3.

FIG. 9 is a view of the insulative housing according to the invention in cross section taken along the line IX—IX in FIG. 8, to a larger scale and relating to the aforementioned further application.

FIG. 10 is a view in cross section analogous to that of FIG. 9 relating to a still further application.

FIG. 11 is a perspective view of a different embodiment of the insulative housing according to the invention, as seen from below.

DETAILED DESCRIPTION OF THE PREFERRED EMBODIMENT

Figure 1:
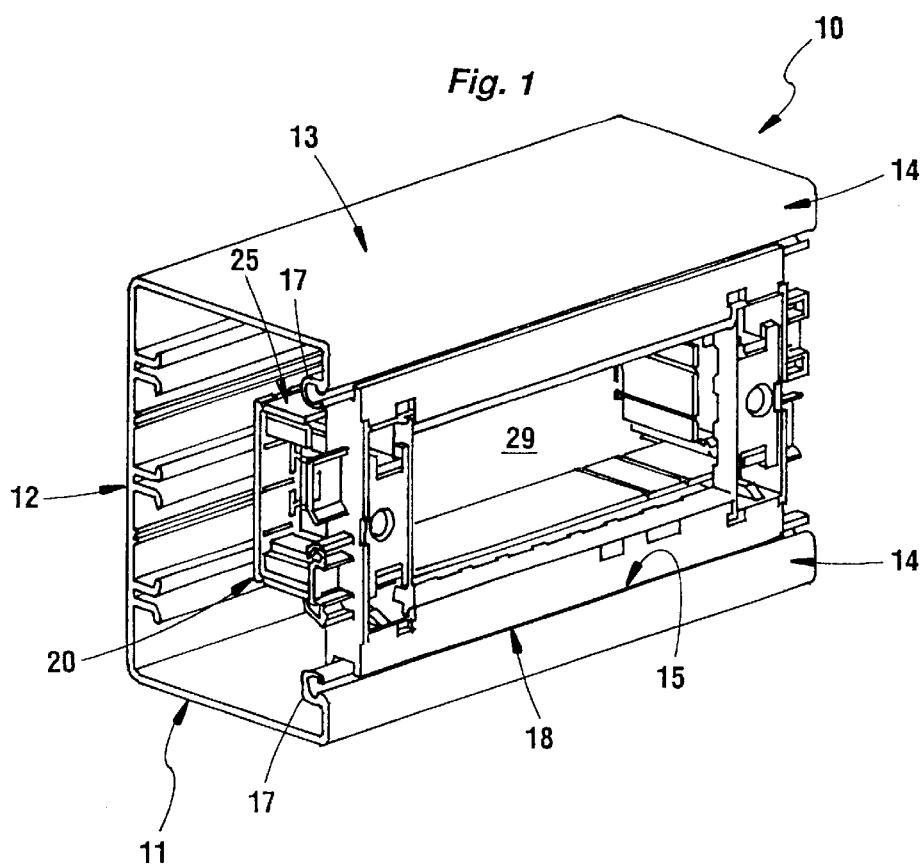
FIG. 1 is a perspective view of the base section of trunking fitted with a support to which an insulative housing according to the invention is attached.

As shown in the figures, the trunking 10 includes a base section 11 which has an open cross section.

In the embodiment shown, the cross section is globally rectangular and the base section 11 has a back 12 adapted to be applied to a wall, not shown, and two side flanges 13 substantially perpendicular to the back 12 and the same height.

In this embodiment, the base section 11 has also two rims 14 upstanding from the free edge of each of the two side flanges 13, extending towards each other in the direction parallel to the back 12 and conjointly defining the outlet 15 of the base section.

The trunking 10 is naturally completed by a cover section, not shown, adapted to be attached to the base section 11 to close it.

In practice the cover section extends from one of the rims 14 to the other and is retained by a clipping channel 17 along each of their free edges.

The foregoing arrangements are well known in the art and as they are not in themselves relevant to the present invention they are not described in more detail here.

In a manner that is also known in the art, when equipment, for example electrical equipment, not shown, is to be attached to the base section 11 a support 18 is used which is adapted to receive the equipment and to be attached to the base section 11.

Because the support 18 is also well known in the art and not in itself relevant to the present invention it is not described in more detail here either.

Suffice to say that, in the embodiments shown, it has a globally rectangular contour in plan view with groove means 19 on two opposite sides adapted to interengage with the rims 14 of the base section 11 simply by nesting over the clipping channels 17 formed thereby.

In the embodiment more particularly shown in FIGS. 1 to 7, schematically or otherwise, the support 18 is reduced to a frame which is entirely flush with the rims 14 of the base section 11 and therefore does not project from the base section.

Finally, in a manner known in the art, the equipment attached to the base section 11 in this way by means of a support 18 is associated with an insulative housing 20 including, as described in more detail below, suspension means 21 for attaching it to the support 18 and a shroud 22 which surrounds the equipment mounted on the support 18, at a distance therefrom, the shroud 22 having a side wall 25 along at least part of its perimeter for this purpose.

According to the invention, the suspension means 21 of the insulative housing 20 are suspension members 26 provided with attachment means 27 at two or more different levels, and over at least part of the perimeter of the insulative housing 20 the top part 251 at least of the side wall 25 of the shroud 22 is removable.

In the embodiment shown, the side wall 25 of the shroud 22 extends all around, or virtually all around, its perimeter and the shroud 22 includes a back 29 in addition to its side wall 25.

It is therefore generally cup-shaped.

Like the back 29, the side wall 25 has a globally rectangular contour in plan view, including two transverse panels 25A and two longitudinal panels 25B alternating with the two transverse panels 25A.

However, in the embodiment shown, the middle portion 30 of the transverse panels 25A is set back in the inward direction relative to the end portion 31 and parallel thereto.

Also, in this embodiment, the suspension members 26 are integral with the back 29 of the shroud 22 and form part of its side wall 25.

To be more precise, the suspension members 26 are operative between the middle portion 30 and the transverse panels 25A of the side wall 25 and the end portions 31 of the transverse panels 25A.

Thus the insulative housing 20 as a whole has four suspension members 26, one in each corner area of its shroud 22.

In practice the suspension members 26 take the form of tongues whose width is substantially parallel to the longitudinal panels 25B of the side wall 25 of the shroud 22 and therefore substantially perpendicular to the middle portion 30 of the transverse panels 25A of the side wall 25 and to the end portions 31 of the transverse panels 25A. Their height, as measured from the back 29 of the shroud 22, is greater than that of the side wall 25.

In practice, the suspension members 26 are isolated from the rest of the side wall 25 of the shroud 22 by slots 32 which run their entire height starting from the back 29 of the shroud 22.

Thus each suspension member 26 has on one side a slot 32 which isolates it from the middle portion 30 of the corresponding transverse panel 25A of the side wall 25 and a slot 32 which isolates it from the corresponding end portion 31 of the transverse panel 25A.

In the embodiment shown, the attachment means 27 of the suspension members 26 are simple detents parallel to the back 29 of the shroud 22.

As shown here, for example, the attachment means 27 project from the inward facing surfaces of the suspension members 26 and are parallel to the longitudinal panels 25B of the side wall 25 of the shroud 22.

As is the case in the embodiment shown, starting from their free end, the suspension members 26 preferably each comprise at least two sections 26', 26", namely a top section 26' and a bottom section 26", each of which is provided with attachment means 27 to form the attachment means 27 on two different levels previously referred to, separated from each other by a weaker area 33 enabling the section 26', 26" at the greater distance from the back 29 of the shroud 22, which here is the top section 26', to be broken off.

Like the attachment means 27, the weaker area 33 is parallel to the back 29 of the shroud 22.

It is provided by a cut 34 in the surface of the suspension members 26 opposite that from which the attachment means 27 project, for example.

In practice, the attachment means 27 are of the same type on both sections 26', 26" of the suspension members 26.

They are therefore all able to cooperate in the same way with the complementary attachment means 35 on the support 18.

In practice the attachment means 35 are simple detents formed by the edges of openings 36 provided for this purpose in the support 18, in corresponding relationship to the suspension members 26 of the insulative housing 20, enabling the suspension members 26 to interengage with the support 18.

The attachment means 27 on the top section 26' of the suspension members 26 are level with the free end of the top section 26'.

The attachment means 27 on the bottom section 26" are at the same level as the corresponding weaker area 33.

In the embodiment shown, the attachment means 27 of the bottom section 2611 of the suspension members 26 are in practice at substantially the same level as the free edge of the side wall 25 of the shroud 22, lying slightly above that free edge.

In the embodiment shown, the bottom section 26" of the suspension members 26 is stiffened by a rib 38 on the side opposite the attachment means 27 and extending at least part of its height from the back 29 of the shroud 22.

In the embodiment shown, the side wall 25 of the shroud 22 is removable over its entire height.

To this end, and starting from its free edge, the side wall 25 of the shroud 22 in the embodiment shown is divided into at least two portions, the top part 25', and a bottom part 25" with a weaker area 39 at the base of each of 25', 25" to enable the top and bottom parts 25', 25" to be broken off.

As shown here, for example, only two portions are provided over the full height of the side wall 25 of the shroud 22, namely the bottom part 25" in addition to the top part 25'.

The cut 40 on the bottom portion 25" is at the same level as the back 29.

In the embodiment shown, all around the perimeter of the insulative housing 20 the side wall 25 of the shroud 22 is divided into panels 41 by slots 42 which are in practice perpendicular to the back 29.

This is therefore the case with both the transverse panels 25A of the side wall 25 and its longitudinal panels 25B.

In the embodiment shown, and around at least part of the perimeter of the insulative housing 20, the back 29 of the shroud 22 has, at least locally, and beyond the side wall 25 of the shroud 22, an extension 44 which is at least partly removable.

In practice, like the side wall 25, this extension 44 of the back 29 includes two transverse panels 44A which are in line with the middle portion 30 of the transverse panels 25A of the side wall 25, between the end portions 31 of those transverse panels 25A, and longitudinal panels 44B which run along the longitudinal panels 25B of the side wall 25.

The extension 44 of the back 29 of the shroud 22 is preferably removable in its entirety, i.e. both its transverse panels 44A and its longitudinal panels 44D.

As shown here, for example, the transverse panels 44A are substantially the same thickness as the back 29 and to make them removable they are separated from it by spaced slots 45 throughout their thickness along their root portion.

The thickness of the longitudinal panels 44B is much less than that of the back 29, which is sufficient to make them removable.

In the embodiment shown, like the side wall 25 of the shroud 22, the extension 44 of the back 29 of the shroud 22 is divided into panels 46 by slots 47.

In practice, the slots 47 in the longitudinal panels 44B of the extension 44 are in corresponding relationship to corresponding slots 42 dividing the longitudinal panels 25B of the side wall 25 into panels 41.

Finally, in the embodiment shown, the transverse panels 25A of the side wall 25 of the shroud 22 are separated from the longitudinal panels 25B of the side wall 25 by slots 48 which extend the full height of the side wall 25, in the corner areas thereof.

In the first application, shown in FIGS. 1 to 6, the side wall 25 of the shroud 22 is retained in its entirety, and likewise the suspension members 26.

Figure 2:
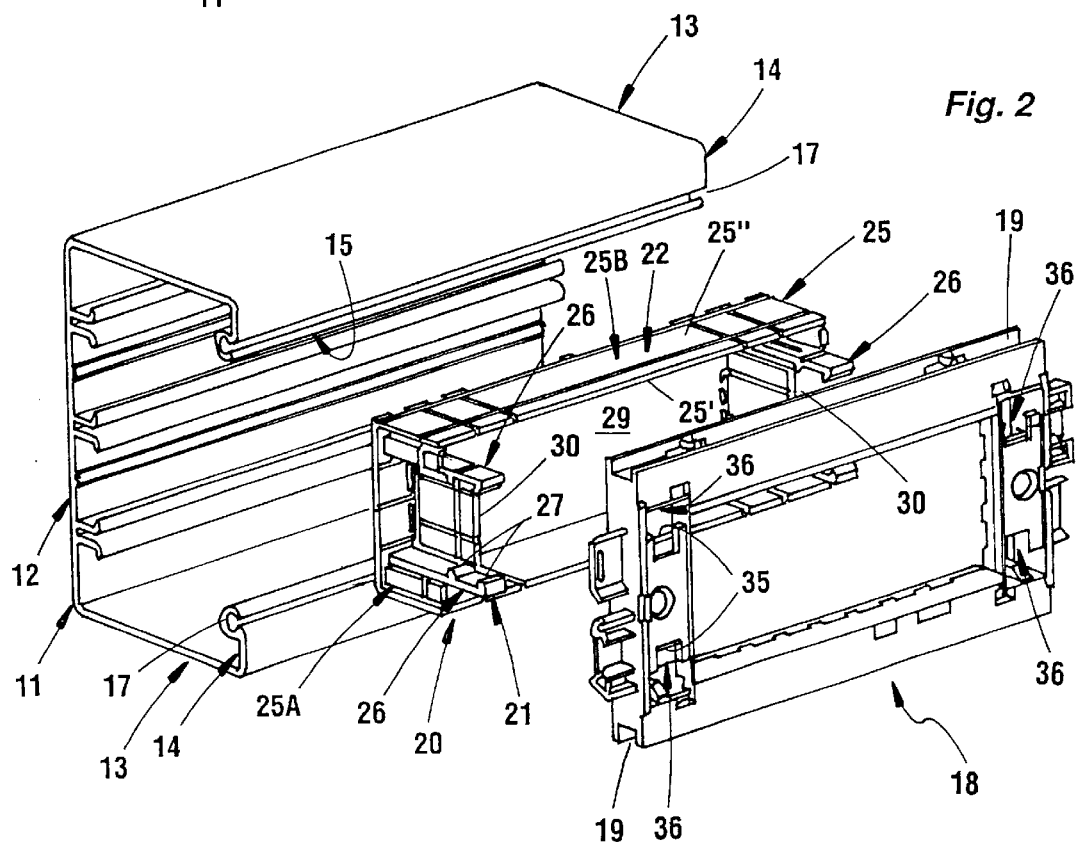
FIG. 2 is an exploded perspective view derived from FIG. 1.
Figure 5:
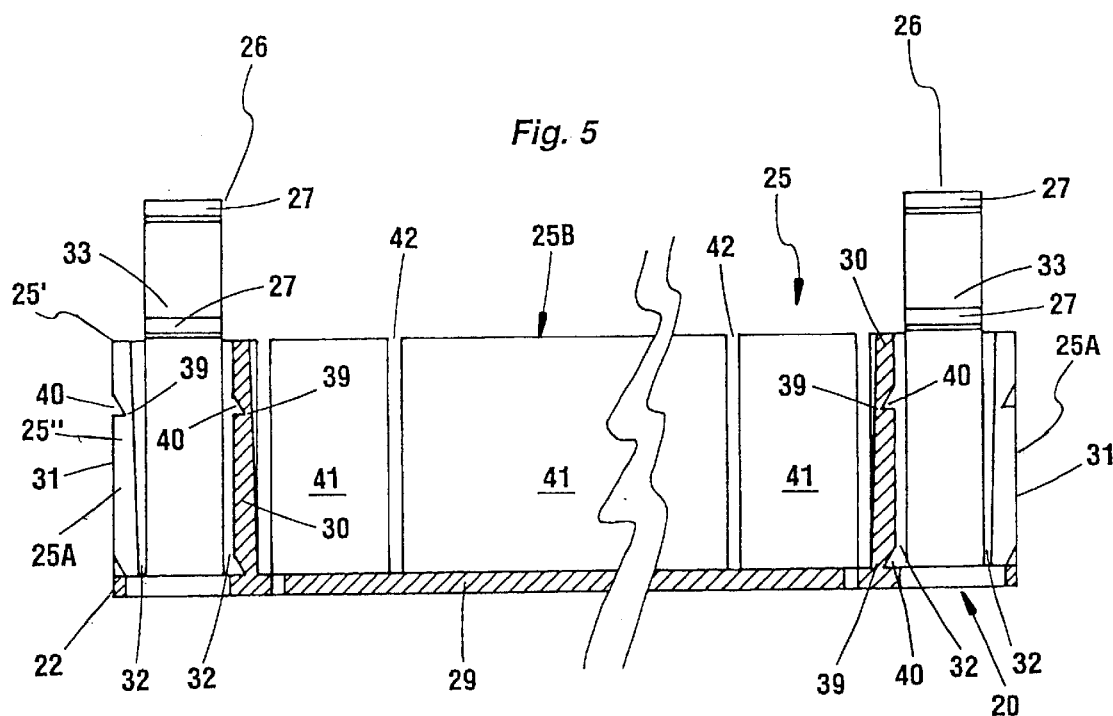
FIG. 5 is a partial view of the insulative housing in longitudinal section taken along the line V—V in FIG. 4.
Figure 6:
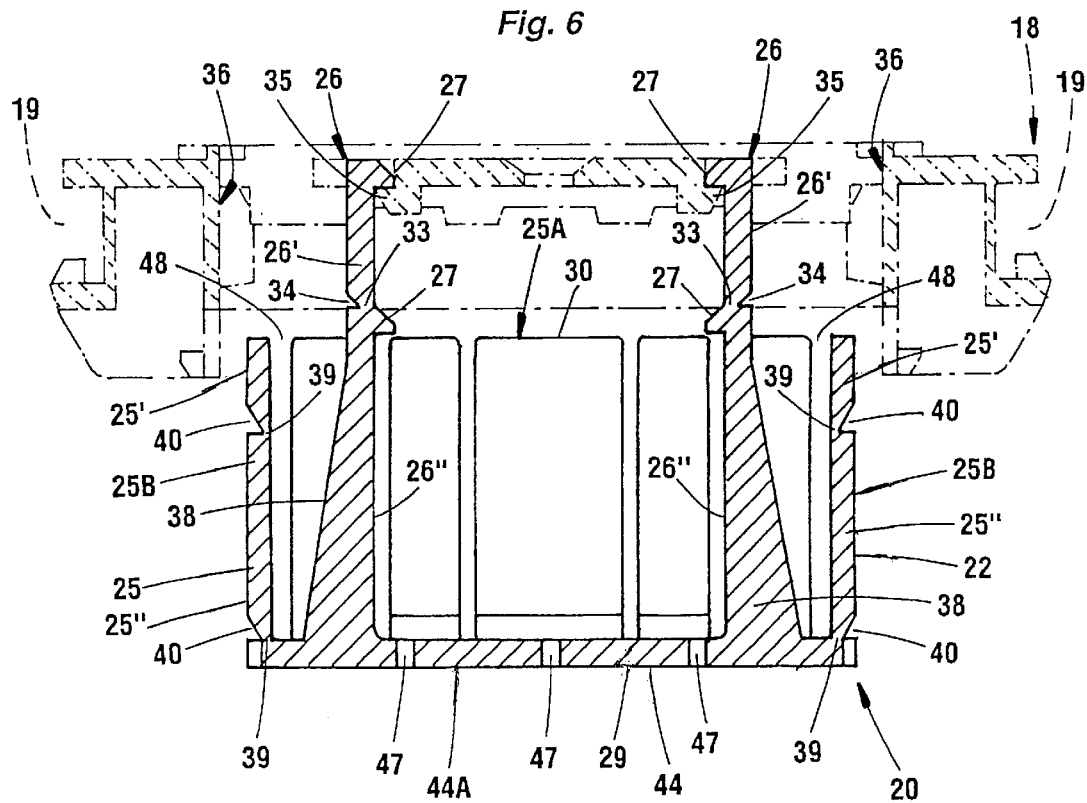
FIG. 6 is a view of the insulative housing in cross section taken along the line VI—VI in FIG. 3 and relating to a first application.

However, in FIGS. 1, 2 and 6 the longitudinal panels 44B of the extension 44 of the back 29 of the shroud 22 have been removed.

Figure 7:
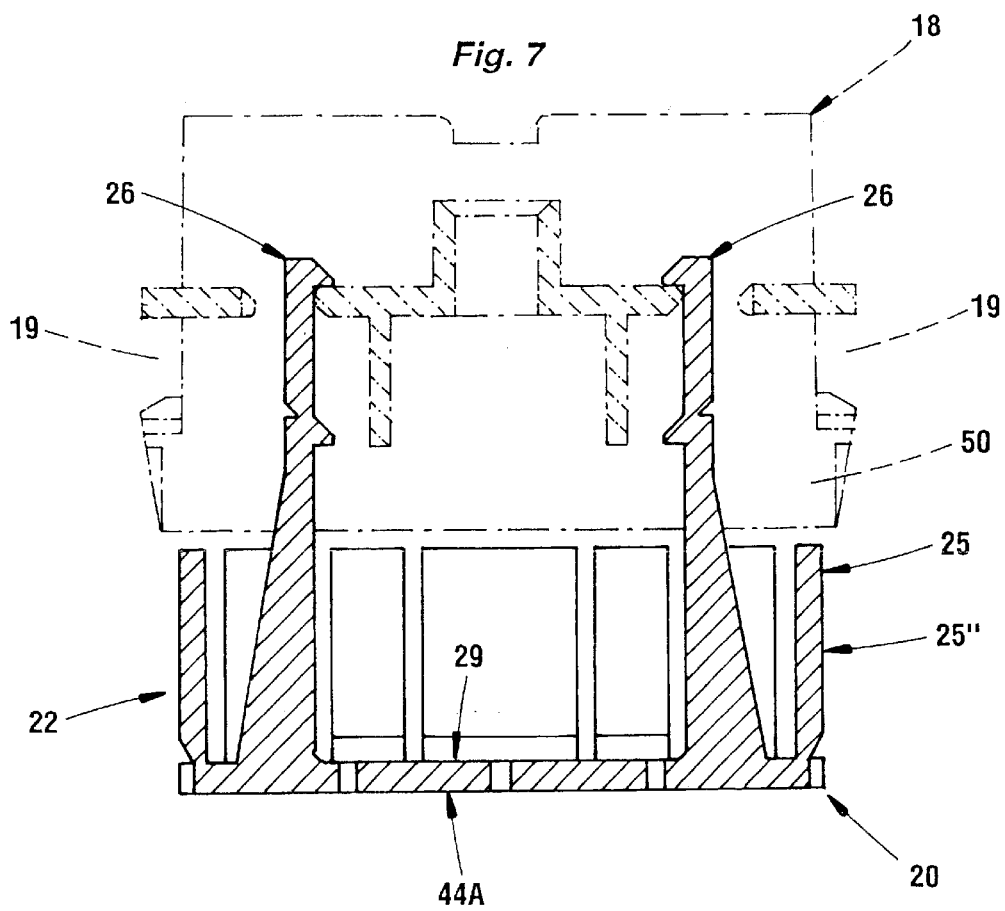
FIG. 7 is a view in cross section analogous to that of FIG. 6 relating to a second application.

Likewise in the second application, shown in FIG. 7.

However, in this second application, the top part 25' of the side wall 25 of the shroud 22 has also been removed, leaving only the bottom part 25" of the side wall 25. This is because, as shown in chain-dotted line in FIG. 7, the support 18 is of a different type to the previous one, this support 18 having a recess 50 below its groove means 19.

Figure 8:
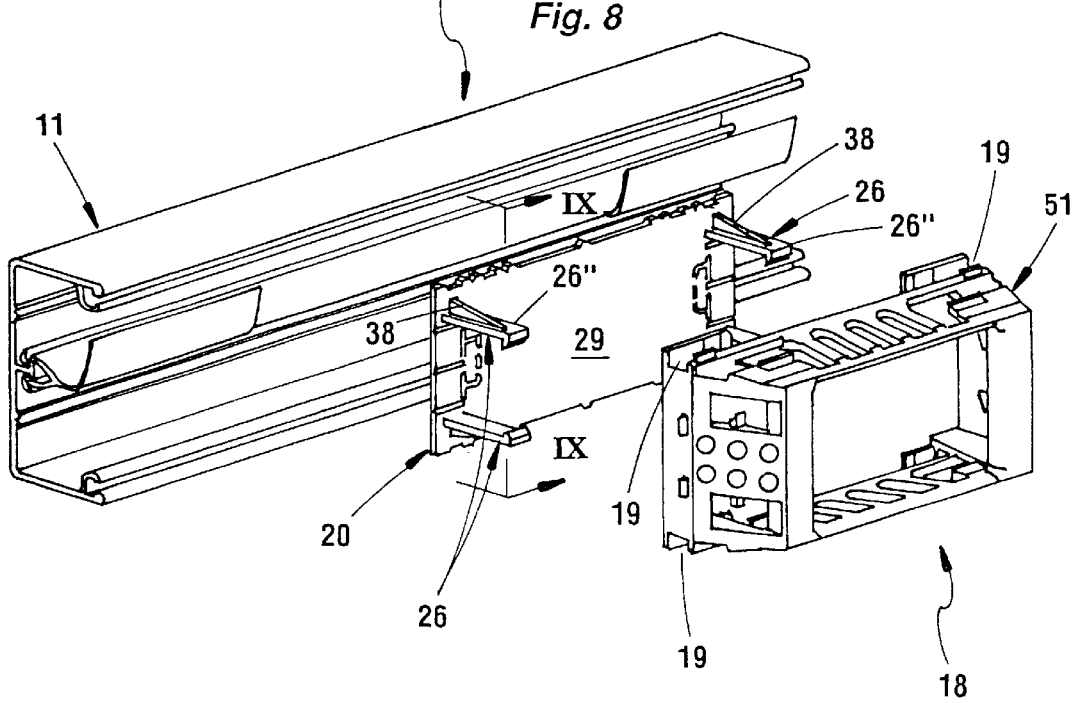
FIG. 8 is an exploded perspective view analogous to that of FIG. 2 relating to a further application.

In the application shown in FIGS. 8 and 9 the support 18 is of a third type.

It is in practice a raised support 18, i.e. a support 18 having, above its groove means 19, a superstructure 51 adapted to project at least partly from the base section 11 when, as here, the height or depth of the base section is relatively small.

In this case, the side wall 25 of the shroud 22 of the insulative housing 20 is also totally eliminated, as shown.

The same applies to the application shown in FIG. 10, which is similar to that shown in FIGS. 8 and 9 except that the base section 11 is wider.

In this case, and as shown here, the longitudinal panels 44B of the extension 44 of the back 29 of the shroud 22 are advantageously retained to provide the necessary isolation.

The embodiment shown in FIG. 11 relates simply to an insulative housing 20 which is longer than the previous insulative housing 20.

In this case, the longitudinal panels 25B of the side wall 25 of the housing 22 have a greater number of panels 41, and likewise the panels 46 of the longitudinal panels 44B of the extension 44 of the back 29 of the shroud 22.

However, the remaining features are of the same kind as previously described.

In all cases, the insulative housing 20 according to the invention can advantageously be molded in one piece from any synthetic material.

Obviously, the fact that the middle portion 30 of the transverse panels 25A of the side wall 25 of the shroud 22 is set back relative to the end portions 31 of the transverse panels 25A, with the suspension members 26 in the gap, has the advantage of facilitating molding.

Be this as it may, the present invention is obviously not limited to the embodiments described and shown, but encompasses all variant executions thereof.

What is claimed is:

1. An insulative housing for equipment to be attached to the base section of trunking by means of a support, said housing including suspension members for attaching the housing to a support and a shroud adapted to surround equipment attached to the support, at a distance therefrom, said shroud having over at least part of its perimeter a side wall, wherein said suspension members have attachment means at two or more different levels, and over at least a part of its perimeter, at least a top portion of the sidewall of said shroud is removable.

2. The insulative housing claimed in claim 1 wherein said suspension members have at least two sections starting from their free end, each of which is provided with said attachment means to provide said attachment means at two different levels, and separated from each other by a weaker area for eliminating the section at the greater distance from a back of said shroud.

3. The insulative housing claimed in claim 2 wherein said attachment means are of the same kind on both sections of said suspension members.

4. The insulative housing claimed in claim 1 wherein said shroud has a back with which said suspension members are integral.

5. The insulative housing claimed in claim 4 wherein said suspension members form part of said side wall of said shroud.

6. The insulative housing claimed in claim 5 wherein said suspension members are isolated from the rest of said side wall of said shroud by slots running their full height.

7. The insulative housing claimed in claim 5 wherein said side wall of said shroud has a globally rectangular contour in plan view with two transverse panels and two longitudinal panels alternating with said two transverse panels, a middle portion of said transverse panels is set back relative to their end portions and said suspension members are operative between said middle portion of said transverse panels of said side wall of said shroud and said end portions of said transverse panels.

8. The insulative housing claimed in claim 1 wherein said side wall of said shroud has a globally rectangular contour in plan view with two transverse panels and two longitudinal panels alternating with said two transverse panels and a middle portion of said transverse panels is set back relative to their end portions.

9. The insulative housing claimed in claim 1 wherein said side wall of said shroud is removable over its entire height.

10. The insulative housing claimed in claim 9 wherein, from its free end, said side wall of said shroud is divided into at least two portions with a weaker area at the base of each of said portions to enable the underlying portion or portions to be eliminated.

11. The insulative housing claimed in claim 1 wherein said side wall of said shroud is divided into panels around its perimeter by slots.

12. The insulative housing claimed in claim 1 wherein a back of said shroud has an extension over at least a part of its perimeter, at least locally and beyond said side wall of said shroud.

13. The insulative housing claimed in claim 12 wherein at least part of said extension of said back of said shroud is removable.

14. The insulative housing claimed in claim 13 wherein the whole of said extension of said back of said shroud is removable.

15. The insulative housing claimed in claim 12 wherein said extension of said back of said shroud is divided into panels by first slots.

16. The insulative housing claimed in claim 15 wherein said side wall of said shroud is divided into panels around its perimeter by second slots and said second slots in said side wall are in corresponding relationship to said first slots in said extension.

* * * * *